United States Patent
Cha

(10) Patent No.: US 12,162,460 B2
(45) Date of Patent: Dec. 10, 2024

(54) METHOD FOR CONTROLLING BRAKE FLUID PRESSURE USING ESC SYSTEM

(71) Applicants: Hyundai Motor Company, Seoul (KR); Kia Corporation, Seoul (KR)

(72) Inventor: Ho Hyun Cha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 240 days.

(21) Appl. No.: 17/872,739

(22) Filed: Jul. 25, 2022

(65) Prior Publication Data

US 2023/0041676 A1 Feb. 9, 2023

(30) Foreign Application Priority Data

Aug. 5, 2021 (KR) ........................ 10-2021-0102887

(51) Int. Cl.
*B60T 8/1755* (2006.01)
*B60T 7/04* (2006.01)
*B60T 13/68* (2006.01)

(52) U.S. Cl.
CPC .......... *B60T 8/17551* (2013.01); *B60T 7/042* (2013.01); *B60T 13/686* (2013.01); *B60T 2210/30* (2013.01); *B60T 2270/306* (2013.01); *B60T 2270/308* (2013.01)

(58) Field of Classification Search
CPC .... B60T 8/17551; B60T 7/042; B60T 13/686; B60T 2210/30; B60T 2270/306; B60T 2270/308
See application file for complete search history.

(56) References Cited

U.S. PATENT DOCUMENTS

| | | | | |
|---|---|---|---|---|
| 5,957,550 A * | 9/1999 | Watanabe | ............... | B60T 8/173 |
| | | | | 303/113.2 |
| 11,511,714 B2 * | 11/2022 | Terasaka | ............. | B60T 8/17616 |
| 11,590,952 B2 * | 2/2023 | Seol | ........................ | B60T 8/32 |
| 11,897,303 B2 * | 2/2024 | Yoshida | ............ | B60G 17/0182 |
| 11,981,316 B2 * | 5/2024 | Leiber | ..................... | B60T 8/4022 |
| 2001/0030463 A1 * | 10/2001 | Tanaka | ................. | B60T 8/4054 |
| | | | | 303/113.1 |
| 2002/0101114 A1 * | 8/2002 | Kamiya | ................ | B60T 8/4275 |
| | | | | 303/114.1 |
| 2005/0253695 A1 * | 11/2005 | Sekizawa | .......... | B60C 23/00372 |
| | | | | 340/442 |
| 2006/0214505 A1 * | 9/2006 | Yamaguchi | ........... | B60T 8/4872 |
| | | | | 303/116.1 |
| 2007/0018497 A1 * | 1/2007 | Nomura | ................ | B60T 8/4059 |
| | | | | 303/3 |
| 2015/0217741 A1 * | 8/2015 | Kikawa | ................. | B60T 13/146 |
| | | | | 701/71 |
| 2015/0329093 A1 * | 11/2015 | Svensson | .............. | B60T 8/1766 |
| | | | | 701/74 |
| 2018/0111607 A1 * | 4/2018 | Fujita | .................... | B60T 8/1755 |
| 2020/0317174 A1 * | 10/2020 | Terasaka | ............... | B60T 13/741 |
| 2021/0001829 A1 * | 1/2021 | Seol | ........................ | B60T 7/06 |
| 2021/0323514 A1 * | 10/2021 | Jung | .................... | B60T 13/745 |
| 2021/0331658 A1 * | 10/2021 | Kim | ....................... | B60T 8/171 |
| 2023/0061807 A1 * | 3/2023 | Yoshida | ............. | B60G 17/0195 |

* cited by examiner

*Primary Examiner* — Luis A Martinez Borrero
(74) *Attorney, Agent, or Firm* — Morgan, Lewis & Bockius LLP

(57) ABSTRACT

A method for controlling a brake fluid pressure using an ESC system in a vehicle is to reduce the braking distance and increase braking safety of a vehicle on a wet road surface by performing brake fluid pressure control based on precipitation data.

20 Claims, 3 Drawing Sheets

METHOD FOR CONTROLLING BRAKE FLUID PRESSURE USING ESC SYSTEM

CROSS REFERENCE TO RELATED APPLICATION

The present application claims priority to Korean Patent Application No. 10-2021-0102887, filed Aug. 5, 2021, the entire contents of which is incorporated herein for all purposes by this reference.

BACKGROUND OF THE INVENTION

Field of the Invention

The present invention relates to a method for controlling a brake fluid pressure using an ESC system, and more particularly, to a method for controlling a brake fluid pressure to reduce the braking distance on a wet road surface and secure braking safety of a vehicle using an ESC system mounted in the vehicle.

Description of Related Art

In general, an Electronic Stability Control (ESC) system, which is a system preventing slipping of wheels of a vehicle, prevents an automotive accident by controlling a brake when the driving state requested by a driver and the actual driving state of the vehicle are different.

Since the ESC system is closely associated with safety for passengers, the ESC system should necessarily satisfy established regulations and there are different tuning parameters, depending on the types of vehicles.

The friction coefficient μ of a road is an important parameter in tuning of the performance of an ESC system. The performance of ESC systems is tuned in the related art through a test on a common road with a high friction coefficient and a test on a common road with a low friction coefficient. That is, the performance of ESC systems of the related art is tuned based on the braking performance on common roads.

However, when a vehicle is driven on a wet road surface, the friction coefficient μ of the road surface decreases, as compared with when a vehicle is driven on a common dry road surface, so that the braking distance of the vehicle increases.

Accordingly, when the performance of an ESC system is tuned based on the braking performance on a common road surface, there is limitation in tuning of the performance of the ESC system.

Accordingly, the performance of an ESC system on a wet road surface is separately tuned at present. Generally, the performance of an ESC system was tuned with a friction coefficient μ of a wet road surface fixed as one value.

However, since the friction coefficient μ of a road surface depends on the degree of wetting of the road surface, when the friction coefficient μ of a wet road surface is fixed as one value, there is limitation in optimization of the performance of an ESC system.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a brake fluid pressure using an ESC system, the method reducing a braking distance on a wet road surface and increasing braking safety of a vehicle by performing brake fluid pressure control based on precipitation data.

The objectives of the present invention are not limited to those described above and other objectives not stated herein may be understood through the following description and may be made clear by embodiments of the present invention. Furthermore, the objectives of the present invention will be achieved by the configurations described in claims and combinations thereof.

To achieve the objectives of the present invention, the present invention includes the following configurations.

A method for controlling a brake fluid pressure using an Electronic Stability Control (ESC) system of the present invention includes: a first step of inducing a driver to decelerate when an actual wheel slip of a vehicle is greater than a first wheel slip which is determined in accordance with actual precipitation; a second step of selectively increasing a brake fluid pressure, which is supplied to a wheel brake of the ESC system, in accordance with real-time precipitation, actual deceleration of the vehicle, and a first deceleration coefficient determined in accordance with the real-time precipitation, through a hydraulic modulator of the ESC system when it is detected that the driver decelerates; a third step of determining whether it is required to additionally increase the brake fluid pressure which is supplied to the wheel brake based on the actual deceleration, an actual wheel slip ratio, and a second deceleration coefficient determined in accordance with the actual wheel slip ratio after increasing the brake fluid pressure; and a fourth step of selectively additionally increasing the brake fluid pressure which is supplied to the wheel brake, depending on the real-time precipitation, the actual deceleration, and the first deceleration coefficient when determining that it is required to additionally increase the brake fluid pressure.

In the second step, a first determination value obtained by dividing the actual deceleration by the real-time precipitation may be compared with the first deceleration coefficient, and the brake fluid pressure which is supplied to the wheel brake may be increased to a fluid pressure value greater than a brake fluid pressure determined in accordance with a brake pedal stroke when the first determination value is smaller than the first deceleration coefficient. In the second step, when the first determination value is equal to or greater than the first deceleration coefficient, the brake fluid pressure which is supplied to the wheel brake may be controlled to a predetermined fluid pressure value.

In the third step, a second determination value obtained by dividing the actual deceleration by the actual wheel slip ratio may be compared with the second deceleration coefficient, and it may be determined that the brake fluid pressure needs to be additionally increased when the second determination value is less than the second deceleration coefficient. In the third step, when the second determination value is equal to or greater than the second deceleration coefficient, it may be determined that the brake fluid pressure does not need to be additionally increased.

In the fourth step, the first determination value may be compared again with the first deceleration coefficient when it is determined that the brake fluid pressure needs to be additionally increased, and when the first determination value is smaller than the first deceleration coefficient, the brake fluid pressure which is supplied to the wheel brake may be additionally increased and then whether the brake fluid pressure needs to be further additionally increased may be determined. In the fourth step, when the first determination value is equal to or greater than the first deceleration coefficient, the brake fluid pressure which is supplied to the wheel brake may be controlled to a predetermined fluid pressure value.

In the second step, whether a driver decelerates may be determined based on a stroke value of a brake pedal of the ESC system.

In the first step, when the real-time precipitation detected by a rain sensor exceeds a predetermined precipitation and the actual wheel slip ratio is greater than a first wheel slip ratio, a driver may be induced to decelerate.

In the first step, when the actual wheel slip ratio is greater than the first wheel slip ratio, warning information may be sent to and displayed on a display.

The rain sensor may detect precipitation when wipers of a vehicle are driven and a number of times of driving of the wipers exceeds a predetermined number of times of driving thereof.

Various aspects of the present invention provide the following effects through the objectives described above.

First, it is possible to precisely control a brake fluid pressure based on precipitation data detected by a rain sensor, and accordingly, it is possible to reduce the braking distance and increase braking safety of a vehicle on a wet road surface.

Second, since the behavior of a vehicle is controlled through step-by-step brake fluid pressure control, it is possible to achieve a smooth and gentle behavior of a vehicle, and accordingly, the commercial value thereof may be improved.

Third, since a brake fluid pressure is controlled based on not only deceleration data of a vehicle, but data such as a wheel slip ratio and precipitation, it is possible to improve reliability of brake fluid pressure control.

Fourth, since the present invention may be achieved by changing only the control method of brakes of a vehicle without addition and change of hardware, the manufacturing cost of a vehicle is not increased in comparison to the related art, and the present invention may be applied even to the existing mass-production vehicles.

Fifth, since braking performance which is suitable for when a driver does not intervene in self-driving vehicles in the future is provided, the commercial value of vehicles may be increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
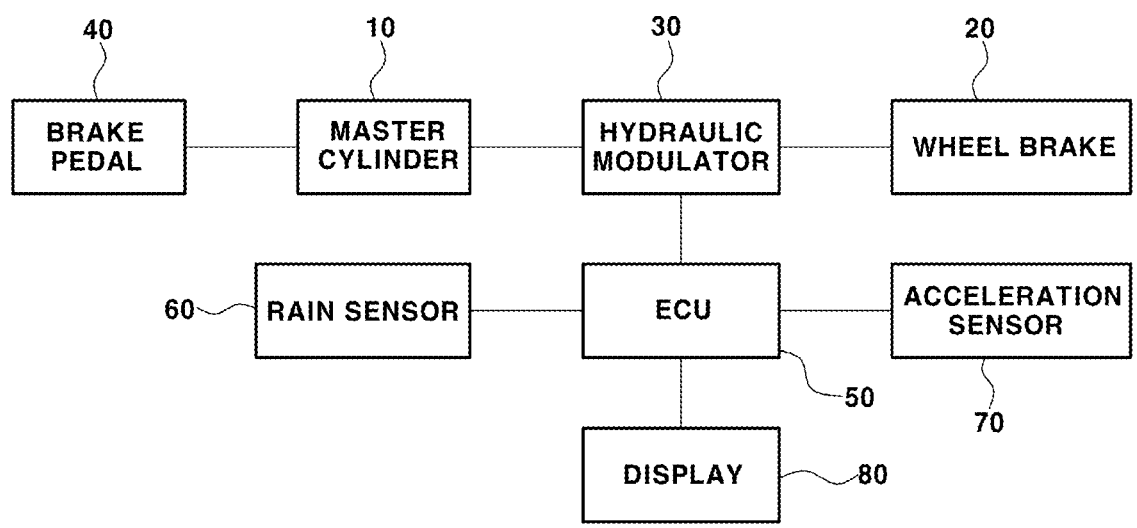
FIG. 1 is a diagram showing a configuration for performing brake fluid pressure control using an ESC according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, embodiments of the present invention will be described in detail with reference to the accompanying drawings. The configurations shown in the accompanying drawings are provided to easily describe exemplary embodiments of the present invention and may be different from actual configurations.

Throughout the exemplary embodiment, unless explicitly described otherwise, "comprising" any components will be understood to imply the inclusion of other components rather than the exclusion of any other components.

Furthermore, in the specification, components are distinguished by terms "first", "second", etc., which is for distinguishing components having the same name without limiting the order or size.

A common Electronic Stability Control (ESC) which is mounted in a vehicle is briefly described first to help understand the present invention.

As known in the art, an ESC system is a system that keeps the driving state of a vehicle stable by selectively controlling a brake fluid pressure to prevent slipping of wheels of the vehicle.

In general, an ESC system includes a hydraulic modulator and a controller. The controller is configured to adjust a brake fluid pressure which is supplied to a brake wheel cylinder of a wheel brake from a master cylinder by controlling the operation of the hydraulic modulator based on data detected by a predetermined sensor mounted on a vehicle.

FIG. 1 is a diagram showing a configuration for performing a brake fluid pressure using an ESC system according to various exemplary embodiments of the present invention, and the configuration includes a brake hydraulic line in which the hydraulic modulator of the ESC system is provided.

Referring to FIG. 1, a hydraulic modulator 30 of an ESC system may be provided in a brake hydraulic line between a brake master cylinder 10 and wheel brake 20. The hydraulic modulator 30 can increase or decrease a brake fluid pressure which is supplied to the wheel brake 20 from the brake master cylinder 10.

When a driver depresses a brake pedal 40, the brake master cylinder 10 generates a brake fluid pressure in accordance with the stroke of the brake pedal 40. The increasing ratio of the brake fluid pressure depends on the stroke of the brake pedal 40 and the brake fluid pressure is transmitted to the wheel brake 20 through the brake hydraulic line and the hydraulic modulator 30.

When the brake fluid pressure of the wheel brake 20 increases, a friction pad is pressed and brought in contact with a brake disc and braking torque is generated by friction between the friction pad and the brake disc. The brake disc is mounted on a wheel hub to integrally rotate with a wheel.

In general, a wheel brake includes a brake wheel cylinder, a friction pad, and a brake disc. The wheel brakes mounted on the front wheels of a vehicle may be referred to as front brakes and the wheel brakes mounted on the rear wheels of a vehicle may be referred to as rear brakes.

Meanwhile, when ESC systems of the related art adjust a brake fluid pressure while a vehicle is driven on a wet road surface, the ESC systems control the brake fluid pressure with the friction coefficient μ of the road surface fixed as one value.

However, since the friction coefficient μ of a road surface depends on the degree of wetting of the road surface, when the friction coefficient μ of a wet road surface is fixed as one value and a brake fluid pressure is adjusted, there is limitation in optimization of the performance of an ESC system and the braking distance of a vehicle.

The present invention has been made to provide a method for controlling a brake fluid pressure of a vehicle, the method performing brake fluid pressure control using an ESC system in consideration of the fact that the friction coefficient μ of a road surface depends on precipitation, reducing the braking distance of a vehicle and increasing braking safety.

The control subject that performs braking fluid pressure control in various exemplary embodiments of the present invention is an electronic control unit 50 mounted in a vehicle. The electronic control unit 50 may include the controller of an ESC system. The electronic control unit 50 may further include one or more controller mounted in a vehicle other than the controller of the ESC system.

As shown in FIG. 1, the electronic control unit 50 controls driving of the hydraulic modulator 30 based on information which is transmitted from a rain sensor 60, an acceleration sensor 70, and etc. provided in a vehicle.

Figure 2:
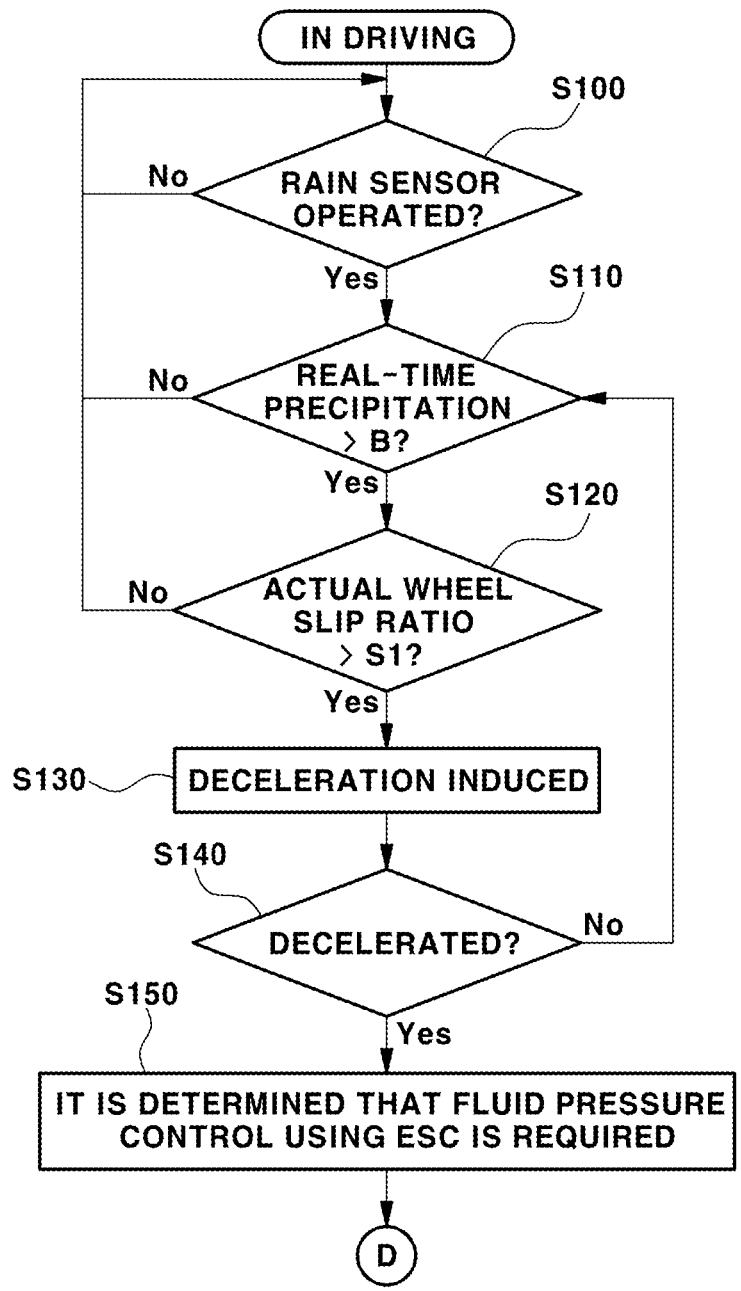
FIG. 2 and FIG. 3 are flowcharts showing a method for controlling a brake fluid pressure using an ESC system according to various exemplary embodiments of the present invention.
Figure 3:
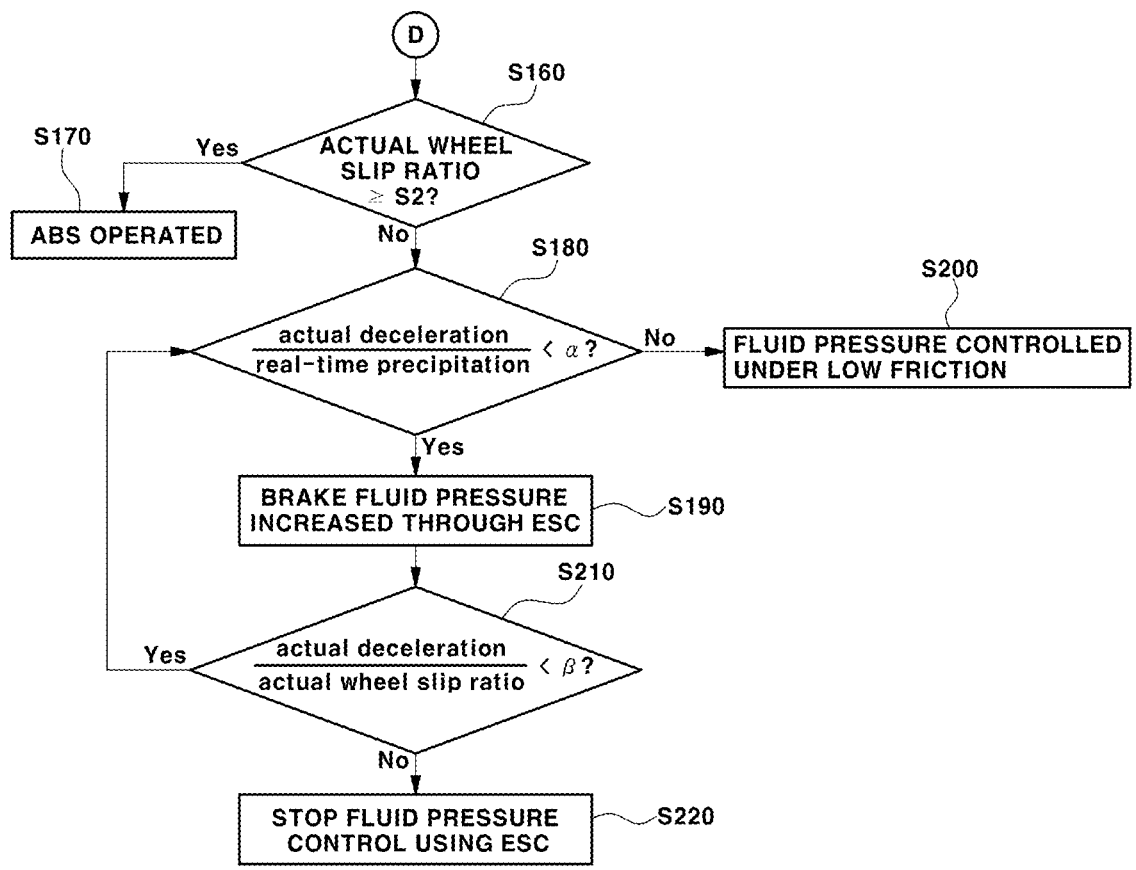

FIG. 2 and FIG. 3 are flowcharts showing a method for controlling a brake fluid pressure using an ESC system of the present invention.

As shown in FIG. 2, when a vehicle is started and starts to be driven, the electronic control unit 50 determines whether the rain sensor 60 operates (S100).

The rain sensor 60 detects real-time precipitation by operating when the wipers of a vehicle are driven. In detail, the rain sensor 60 starts to detect precipitation when the number of time of driving of wipers exceeds a predetermined number of times of driving A.

When the wipers reciprocate left and right on the windshield of a vehicle, it is determined as one-time operation. The number of times of driving A may be determined as a value for excluding that wipers operate when it does not rain. For example, the number of times of driving A may be determined as a value for excluding that wipers operate to wash the windshield of a vehicle after washer fluid is sprayed on the windshield.

When the rain sensor 60 operates and detects real-time precipitation, the electronic control unit 50 determines whether the detected real-time precipitation exceeds a predetermined precipitation B (S110). The precipitation B may be determined as a value that causes a road surface to be excessively wetted. For example, the precipitation B may be determined as a value corresponding to a heavy rain or heavy snow situation and may be 50 mm/h.

When it rains under the precipitation B, a braking distance may be generated at a level similar to when an ESC system of the related art controls a brake fluid pressure under the condition that a vehicle is driven on a common road surface with a low friction coefficient μ or a wet road surface with one fixed friction coefficient μ.

Accordingly, when a precipitation condition to which the brake fluid pressure control of the present invention is applied is limited, the present invention can achieve an effect that cannot be achieved by brake fluid pressure control using an ESC system in the related art. That is, the present invention makes it possible to reduce the braking distance of a vehicle and secure braking stability even though the vehicle is driven on an excessively wet road surface due to a heavy precipitation. The braking distance means the driving distance of a vehicle that has moved until the vehicle is stopped after the brake pedal is depressed.

When the real-time precipitation detected by the rain sensor 60 exceeds the predetermined precipitation, normal braking may be impossible, depending on a wheel slip ratio.

Accordingly, the electronic control unit 50 compares the actual wheel slip ratio of a vehicle with a first wheel slip ratio S1 which is a wheel slip ratio which is determined based on real-time precipitation (S120), and induces a driver to decelerate when the actual wheel slip ratio is greater than the first wheel slip ratio S1 (S130). When the actual wheel slip ratio is greater than the first wheel slip ratio S1, the electronic control unit 50 determines that it is a dangerous situation, in which normal braking is impossible, and deceleration is required.

The first wheel slip ratio S1 may be determined as a value which is determined through pre-testing and evaluation based on wheel slip ratio data collected when real-time precipitation exceeds the precipitation B. In detail, the first wheel slip ratio S1 may be determined as a minimum value at which normal braking is impossible of wheel slip ratio values according to real-time precipitation. The first wheel slip ratio S1 may be variably set, depending on real-time precipitation.

The actual wheel slip ratio of a vehicle may be determined and determined based on a wheel speed detected by a wheel speed sensor and a vehicle speed detected by a vehicle speed sensor. In detail, the wheel slip ratio may be determined by the following Equation 1.

$$\text{wheel slip ratio} = (\text{vehicle speed} - \text{wheel speed})/\text{vehicle speed} \quad \text{Equation 1:}$$

When an actual wheel slip ratio is the first wheel slip ratio S1 or higher, the electronic control unit 50 can induce a driver to recognize that normal braking is impossible and to decelerate by displaying warning information on a display 80 of a vehicle. For example, the electronic control unit 50 can induce a driver to decelerate by sending out and display a warning text, etc. on the display 80 in a vehicle.

When the actual wheel slip ratio is less than the first wheel slip ratio S1, the electronic control unit 50 determines that normal braking is possible, and compares again the real-time precipitation with the predetermined precipitation B while monitoring the real-time precipitation detected by the rain sensor 60 (S110).

The electronic control unit 50 determines whether the driver decelerates after inducing the driver to decelerate in S130 (S140).

For example, the electronic control unit 50 can determine whether a driver decelerates under an intention of braking, based on a stroke value (%) of the brake pedal 40 detected by a pedal stroke sensor. As various exemplary embodiments of the present invention, the electronic control unit 50 may determine whether a driver decelerates under an intention of braking, through a brake pedal switch.

The electronic control unit 50 can determine that a drive has an intention of braking when the real-time stroke of the brake pedal 40 is greater than a predetermined stroke C, and can determine that a driver does not have an intention of braking when the real-time stroke of the brake pedal 40 is the predetermined stroke C or less. The stroke C may be determined as a value showing that a driver does not depress the brake pedal 40.

When determining that a driver does not decelerate, based on the real-time stroke of the brake pedal 40, the electronic control unit 50 compares again the real-time precipitation detected by the rain sensor 60 with the predetermined precipitation B (S110).

When a driver decelerating under an intention of braking is detected, the electronic control unit 50 determines that brake fluid pressure control using an ESC system is required (S150), and performs brake fluid pressure control using an ESC system.

Referring to FIG. 1, the ESC system includes the hydraulic modulator 30 provided in the brake hydraulic line and the hydraulic modulator 30 is disposed between the brake master cylinder 10 and the wheel brake 20. The hydraulic modulator 30 receives and transmits a brake fluid pressure generated by the brake master cylinder 10 to the wheel brake 20.

In various exemplary embodiments of the present invention, the hydraulic modulator 30 selectively increases the brake fluid pressure which is supplied to the wheel brake 20, depending on actual deceleration of a vehicle and real-time precipitation. The hydraulic modulator 30 receives a brake fluid pressure generated in accordance with the real-time stroke of the brake pedal 40 from the brake master cylinder 10. The hydraulic modulator 30 transmits the brake fluid pressure received from one brake master cylinder 10 in a vehicle to a total of four wheel brakes 20 mounted on the wheels, respectively.

The electronic control unit 50 can determine whether maximum braking force or maximum deceleration is required, before performing brake fluid pressure control using an ESC system.

As shown in FIG. 3, the electronic control unit 50 can determine whether an ABS (Anti-lock Brake System) is required to operate by comparing the actual wheel slip ratio of a vehicle with a predetermined second slip ratio S2.

The wheel slip ratio of a vehicle may rapidly increase, depending on the braking condition. When the actual wheel slip ratio of a vehicle detected in real time exceeds the predetermined second wheel slip ratio, the electronic control unit 50 can determine that brake fluid pressure control using an ABS is required.

The second wheel slip ratio S2 may be determined as a critical value for preventing wheels from being locked due to an increase of the actual wheel slip ratio of a vehicle. The second wheel slip ratio S2 is determined as a value smaller than the first wheel slip ratio S1.

When the actual wheel slip ratio of a vehicle reaches the second wheel slip ratio S2 or exceeds the second wheel slip ratio S2, the ABS in the vehicle is operated, whereby it is possible to prevent wheels from being locked.

The ABS can control the brake fluid pressure of the wheel brake 20 to prevent wheels from being locked, depending on the wheel slip ratio. When the ABS is operated, the brake fluid pressure of the wheel brake 20 is adjusted to maintain the maximum deceleration within a range in which the wheels of a vehicle are not locked.

When the actual wheel slip ratio is the second wheel slip ratio S2 or higher, the electronic control unit 50 determines that brake fluid pressure by the ABS is needed, and operates the ABS (S170).

When the actual wheel slip ratio is smaller than the second wheel slip ratio S2, the electronic control unit 50 determines that the ABS does not need to be operated, and performs brake fluid pressure control using the hydraulic modulator 30 of the ESC system.

The electronic control unit 50 can control the brake fluid pressure which is supplied to the wheel brake 20 based on real-time precipitation, and the actual deceleration and the actual wheel slip ratio of a vehicle with a driver depressing the brake pedal 40 under an intention of braking. The actual deceleration of a vehicle may be detected in real time by an acceleration sensor 70 provided in the vehicle.

The electronic control unit 50 can determine whether the behavior of a vehicle is different from the behavior on a common low-frictional road based on real-time precipitation and the actual deceleration of a vehicle to perform brake fluid pressure control using the hydraulic modulator 30.

The electronic control unit 50 can determine whether the behavior of a vehicle is different from the behavior on a common low-frictional road by comparing a first determination value $$\left(\frac{\text{actual deceleration}}{\text{real-time precipitation}}\right)$$

obtained by dividing the actual deceleration of a vehicle by real-time precipitation with a first deceleration coefficient α which is a deceleration coefficient which is determined based on real-time precipitation. For example, the low-frictional road described above may include not only a common road surface with a predetermined friction coefficient μ, but a wet road surface when precipitation is smaller than the precipitation B determined in various exemplary embodiments of the present invention.

The first deceleration coefficient α is a value which is variably determined based on real-time precipitation, and may be determined as a critical value that causes an increase of a braking distance and deterioration of braking safety of a vehicle through pre-testing and evaluation, etc.

The electronic control unit 50 can compare the first determination value $$\left(\frac{\text{actual deceleration}}{\text{real-time precipitation}}\right)$$

with the first deceleration coefficient α (S180), and can selectively increase the brake fluid pressure which is supplied to the wheel brake 20, depending on the comparison result.

When the first determination value $$\left(\frac{\text{actual deceleration}}{\text{real-time precipitation}}\right)$$

is smaller than the first deceleration coefficient α, the electronic control unit 50 increases the brake fluid pressure, which is supplied to the wheel brake 20 of each wheel, through the hydraulic modulator 30 (S190). In other words, when the first determination value $$\left(\frac{\text{actual deceleration}}{\text{real-time precipitation}}\right)$$

is smaller than the first deceleration coefficient α, the hydraulic modulator 30 increases the brake fluid pressure transmitted from the brake master cylinder 10 and equally supplies the increased brake fluid pressure to the wheel brake 20 of each wheel.

The hydraulic modulator 30 can increase the brake fluid pressure by a predetermined fluid pressure (i.e., a first fluid pressure). In other words, the hydraulic modulator 30 can increase the brake fluid pressure which is supplied to the wheel brake 20 to a fluid pressure value greater than the brake fluid pressure determined in accordance with the stroke of the brake pedal. For example, the brake fluid pressure which is supplied to the wheel brake 20 through the hydraulic modulator 30 may be controlled and determined as a fluid pressure value which is the sum of the brake fluid pressure of the wheel brake 20, which is determined in accordance with the stroke of the brake pedal 40, and the first fluid pressure.

The electronic control unit 50 performs fluid pressure control under low friction when the first determination value $$\left(\frac{\text{actual deceleration}}{\text{real-time precipitation}}\right)$$

is the first deceleration coefficient μ or more. The fluid pressure control under low friction is to control the brake fluid pressure which is supplied to the wheel brake 20 using the hydraulic modulator 30, that is, to control and determine the brake fluid pressure of the wheel brake 20 as a predetermined fluid pressure value to stabilize the behavior of a vehicle which is being driven. The value of the brake fluid pressure which is applied when a fluid pressure is controlled under low friction may be set as a fluid pressure value obtained through tests and evaluation for each type of vehicle.

The electronic control unit 50 utilizes actual deceleration data and actual wheel slip ratio data of a vehicle to determine whether target deceleration of the vehicle is achieved by increasing a brake fluid pressure through the hydraulic modulator 30 in S190.

That is, the actual deceleration and the target deceleration are not compared to determine whether target deceleration of the vehicle is achieved in various exemplary embodiments of the present invention, and whether the target deceleration is achieved is determined based on the actual deceleration and the actual wheel slip ratio.

The electronic control unit 50 can determine whether target deceleration of a vehicle is achieved (i.e., whether it is required to additionally increase the brake fluid pressure) based on the actual deceleration, the actual wheel slip ratio, and a second deceleration coefficient β which is a deceleration coefficient determined in accordance with the actual wheel slip ratio, after increasing the brake fluid pressure which is supplied to the wheel brake 20 through the hydraulic modulator 30.

In detail, the electronic control unit 50 determines whether it is required to additionally increase the brake fluid pressure by comparing a second determination value.

$$\left(\frac{\text{actual deceleration}}{\text{actual wheel slip ratio}}\right),$$

which is obtained by dividing the actual deceleration of a vehicle by the actual wheel slip ratio, with the second deceleration coefficient β.

The target deceleration may be determined based on the stroke of the brake pedal depressed by a driver, and a vehicle speed. The second deceleration coefficient β is a value which is variably determined based on the actual wheel slip ratio of a vehicle, and may be determined as a critical value that causes an increase of a braking distance and deterioration of braking safety of a vehicle through pre-testing and evaluation, etc.

The electronic control unit 50 can compare the second determination value $$\left(\frac{\text{actual deceleration}}{\text{actual wheel slip ratio}}\right)$$

with the second deceleration coefficient β (S210), and can selectively additionally increase the brake fluid pressure of the wheel brake 20, depending on the comparison result.

In other words, when the second determination value $$\left(\frac{\text{actual deceleration}}{\text{actual wheel slip ratio}}\right)$$

is less than the second deceleration coefficient β, the electronic control unit 50 can increase step by step the brake fluid pressure which is supplied to the wheel brake 20 by selectively repeating S180 and S190 until the second determination value reaches the second deceleration coefficient β.

When the second determination value β is less than the second deceleration coefficient, the electronic control unit 50 determines that it is required to additionally increase the brake fluid pressure which is supplied to the wheel brake, determines again the first determination value α, and compares again the first determination value α with the first deceleration coefficient (S180).

When the first determination value $$\left(\frac{\text{actual deceleration}}{\text{real-time precipitation}}\right)$$

is less than the first deceleration coefficient α, the electronic control unit 50 increases the brake fluid pressure which is supplied to the wheel brake 20 by a first fluid pressure value (S190) and then determines whether it is required to additionally increase the brake fluid pressure (S210). In the instant case, the brake fluid pressure which is supplied to the wheel brake 20 may be controlled and determined as the sum of the brake fluid pressure determined in accordance with the stroke of the brake pedal 40 and a fluid pressure value according to the number of times of increasing pressure.

The number of times of increasing pressure is the number of times of increasing the brake fluid pressure which is supplied to the wheel brake 20, and the fluid pressure according to the number of times of increasing pressure is determined as a value obtained by multiplying the first fluid pressure by the number of times of increasing pressure.

When the first determination value $$\left(\frac{\text{actual deceleration}}{\text{real-time precipitation}}\right)$$

is the first deceleration coefficient α, the electronic control unit 50 controls and determines the brake fluid pressure of the wheel brake 20 as a predetermined fluid pressure value according to the types of vehicles by performing fluid pressure control under low friction (S200).

As described above, according to various exemplary embodiments of the present invention, it is possible to determine whether target deceleration is achieved based on not only deceleration of a vehicle, but a wheel slip ratio, it is possible to precisely control a fluid pressure by increasing the brake fluid pressure of the wheel brake step by step in accordance with the determination result, and it is possible to reduce the braking distance and increase braking safety of the vehicle.

When the second determination value $$\left(\frac{\text{actual deceleration}}{\text{actual wheel slip ratio}}\right)$$

is the second deceleration coefficient β or more, the electronic control unit 50 determines that it is not required to additionally increase the brake fluid pressure which is supplied to the wheel brake 20, and stops brake fluid pressure control that utilizes the hydraulic modulator 30 (S220).

The electronic control unit 50 can determine again whether the rain sensor 60 is in operation, after stopping the brake fluid pressure control that utilizes the hydraulic modulator 30.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a brake fluid pressure using an Electronic Stability Control (ESC) system, the method comprising:

inducing, by the ESC system, a vehicle to be decelerated when an actual wheel slip of the vehicle is greater than a first wheel slip which is determined in accordance with real-time precipitation;

increasing, by the ESC system, the brake fluid pressure, which is supplied to a wheel brake of the ESC system, to a first predetermined fluid pressure value, in accordance with the real-time precipitation, actual deceleration of the vehicle, and a first deceleration coefficient determined in accordance with the real-time precipitation, through a hydraulic modulator of the ESC system when it is detected that the vehicle is decelerated;

determining, by the ESC system, whether it is required to additionally increase the brake fluid pressure which is supplied to the wheel brake based on the actual deceleration, an actual wheel slip ratio, and a second deceleration coefficient determined in accordance with the actual wheel slip ratio after increasing the brake fluid pressure; and additionally increasing, by the ESC system, the brake fluid pressure which is supplied to the wheel brake to a second predetermined fluid pressure value, depending on the real-time precipitation, the actual deceleration, and the first deceleration coefficient when determining that it is required to additionally increase the brake fluid pressure.

2. The method of claim 1, further including:
in the increasing of the brake fluid pressure,
comparing a first determination value obtained by dividing the actual deceleration by the real-time precipitation with the first deceleration coefficient; and
increasing the brake fluid pressure which is supplied to the wheel brake to a fluid pressure value greater than the brake fluid pressure determined in accordance with a brake pedal stroke when the first determination value is smaller than the first deceleration coefficient.

3. The method of claim 2, further including:
in the increasing of the brake fluid pressure,
when the first determination value is equal to or greater than the first deceleration coefficient, controlling the brake fluid pressure which is supplied to the wheel brake to a predetermined fluid pressure value.

4. The method of claim 1, further including:
in the determining whether it is required to additionally increase the brake fluid pressure,
comparing a second determination value obtained by dividing the actual deceleration by the actual wheel slip ratio with the second deceleration coefficient; and
concluding that the brake fluid pressure needs to be additionally increased when the second determination value is less than the second deceleration coefficient.

5. The method of claim 4, further including:
in the determining whether it is required to additionally increase the brake fluid pressure,
when the second determination value is equal to or greater than the second deceleration coefficient, concluding that the brake fluid pressure does not need to be additionally increased.

6. The method of claim 2, further including:
in the additionally increasing the brake fluid pressure,
comparing the first determination value again with the first deceleration coefficient when it is determined that the brake fluid pressure needs to be additionally increased;
when the first determination value is smaller than the first deceleration coefficient, additionally increasing the brake fluid pressure which is supplied to the wheel brake; and
determining whether the brake fluid pressure needs to be further additionally increased.

7. The method of claim 6, further including:
in the additionally increasing the brake fluid pressure,
when the first determination value is equal to or greater than the first deceleration coefficient, controlling the brake fluid pressure which is supplied to the wheel brake to a predetermined fluid pressure value.

8. The method of claim 1, further including:
in the increasing of the brake fluid pressure,
determining whether the vehicle is decelerated based on a stroke value of a brake pedal of the ESC system.

9. The method of claim 1, further including:
in the inducing of the vehicle to be decelerated,
when the real-time precipitation detected by a rain sensor exceeds a predetermined precipitation and the actual wheel slip ratio is greater than a first wheel slip ratio, inducing the vehicle to be decelerated.

10. The method of claim 1, further including:
in the inducing of the driver to decelerate,
when the actual wheel slip ratio is greater than a first wheel slip ratio, sending warning information to and displaying the warning information on a display.

11. The method of claim 9, wherein the rain sensor is configured to detect precipitation when wipers of the vehicle are driven and a number of times of driving of the wipers exceeds a predetermined number of times of driving thereof.

12. An Electronic Stability Control (ESC) system for controlling a brake fluid pressure, the ESC system comprising:
a brake master cylinder and a wheel brake;
a hydraulic modulator between the brake master cylinder and the wheel brake, wherein the hydraulic modulator is configured to increase or decrease the brake fluid pressure which is supplied to the wheel brake from the brake master cylinder; and
a controller electrically connected to the hydraulic modulator, wherein the controller is configured for:
inducing a vehicle to be decelerated when an actual wheel slip of the vehicle is greater than a first wheel slip which is determined in accordance with real-time precipitation;
increasing the brake fluid pressure, which is supplied to the wheel brake, to a first predetermined fluid pressure value, in accordance with the real-time precipitation, actual deceleration of the vehicle, and a first deceleration coefficient determined in accordance with the real-time precipitation, through the hydraulic modulator of the ESC system when the controller concludes that the vehicle is decelerated;
determining whether it is required to additionally increase the brake fluid pressure which is supplied to the wheel brake based on the actual deceleration, an actual wheel slip ratio, and a second deceleration coefficient determined in accordance with the actual wheel slip ratio after increasing the brake fluid pressure; and
additionally increasing the brake fluid pressure which is supplied to the wheel brake, to a second predetermined fluid pressure value, depending on the real-time precipitation, the actual deceleration, and the first deceleration coefficient when determining that it is required to additionally increase the brake fluid pressure.

13. The ESC system of claim 12, wherein,
in the increasing of the brake fluid pressure, the controller is configured for:
comparing a first determination value obtained by dividing the actual deceleration by the real-time precipitation with the first deceleration coefficient; and
increasing the brake fluid pressure which is supplied to the wheel brake to a fluid pressure value greater than the brake fluid pressure determined in accordance with a brake pedal stroke when the first determination value is smaller than the first deceleration coefficient.

14. The ESC system of claim 13, wherein,
in the increasing of the brake fluid pressure, the controller is configured for controlling the brake fluid pressure which is supplied to the wheel brake to a predetermined fluid pressure value, when the controller concludes that the first determination value is equal to or greater than the first deceleration coefficient.

15. The ESC system of claim 12, wherein,
in the determining whether it is required to additionally increase the brake fluid pressure, the controller is configured for:
comparing a second determination value obtained by dividing the actual deceleration by the actual wheel slip ratio with the second deceleration coefficient, and
concluding that the brake fluid pressure needs to be additionally increased when the second determination value is less than the second deceleration coefficient.

16. The ESC system of claim 15, wherein,
in the determining whether it is required to additionally increase the brake fluid pressure,
when the second determination value is equal to or greater than the second deceleration coefficient, the controller is configured for concluding that the brake fluid pressure does not need to be additionally increased.

17. The ESC system of claim 13, wherein,
in the additionally increasing the brake fluid pressure, the controller is configured for:
comparing the first determination value again with the first deceleration coefficient when the controller concludes that the brake fluid pressure needs to be additionally increased, and
when the first determination value is smaller than the first deceleration coefficient, additionally increasing the brake fluid pressure which is supplied to the wheel brake and
determining whether the brake fluid pressure needs to be further additionally increased.

18. The ESC system of claim 17, wherein,
in the additionally increasing the brake fluid pressure, the controller is configured for controlling the brake fluid pressure which is supplied to the wheel brake to a predetermined fluid pressure value when the controller concludes that the first determination value is equal to or greater than the first deceleration coefficient.

19. The ESC system of claim 12, wherein,
in the inducing of the vehicle to be decelerated,
the controller is configured for inducing the vehicle to be decelerated, when the controller concludes that the real-time precipitation detected by a rain sensor exceeds a predetermined precipitation and the actual wheel slip ratio is greater than a first wheel slip ratio.

20. The ESC system of claim 12, wherein,
in the inducing of the vehicle to be decelerated, the controller is configured for sending warning information to and displaying the warning information on a display, when the controller concludes that the actual wheel slip ratio is greater than a first wheel slip ratio.

* * * * *